(12) United States Patent
Ingerman

(10) Patent No.: US 12,507,047 B2
(45) Date of Patent: Dec. 23, 2025

(54) IDENTIFICATION AND COORDINATION OF OPPORTUNITIES FOR VEHICLE TO VEHICLE WIRELESS CONTENT SHARING

(71) Applicant: Akamai Technologies Inc., Cambridge, MA (US)

(72) Inventor: Mark M. Ingerman, Newton, MA (US)

(73) Assignee: Akamai Technologies, Inc., Cambridge, MA (US)

( * ) Notice: Subject to any disclaimer, the term of this patent is extended or adjusted under 35 U.S.C. 154(b) by 961 days.

(21) Appl. No.: 17/077,209

(22) Filed: Oct. 22, 2020

(65) Prior Publication Data

US 2022/0132283 A1    Apr. 28, 2022

(51) Int. Cl.
| | |
|---|---|
| *H04L 29/06* | (2006.01) |
| *G06N 20/00* | (2019.01) |
| *H04W 4/02* | (2018.01) |
| *H04W 4/44* | (2018.01) |
| *H04W 12/08* | (2021.01) |
| *H04W 12/63* | (2021.01) |
| *H04W 72/51* | (2023.01) |
| *H04W 76/14* | (2018.01) |

(52) U.S. Cl.
CPC ............. *H04W 4/44* (2018.02); *G06N 20/00* (2019.01); *H04W 4/023* (2013.01); *H04W 12/08* (2013.01); *H04W 12/63* (2021.01); *H04W 72/51* (2023.01); *H04W 76/14* (2018.02)

(58) Field of Classification Search
CPC ....... H04W 4/44; H04W 76/14; H04W 12/63; H04W 72/51; H04W 4/023; H04W 12/08
See application file for complete search history.

(56) References Cited

U.S. PATENT DOCUMENTS

| | | | |
|---|---|---|---|
| 6,108,703 | A | 8/2000 | Leighton et al. |
| 7,058,706 | B1 | 6/2006 | Iyer et al. |
| 7,096,263 | B2 | 8/2006 | Leighton et al. |
| 7,096,266 | B2 | 8/2006 | Lewin et al. |
| 7,124,943 | B2 | 10/2006 | Quan et al. |

(Continued)

OTHER PUBLICATIONS

PCT/US2021071914, counterpart to current application, International Search Report, mailed on Dec. 30, 2021, 5 pages.

(Continued)

*Primary Examiner* — Evans Desrosiers

(57) ABSTRACT

Disclosed herein are systems and methods for coordinating the wireless sharing of content between vehicles in a secure and efficient manner. In one embodiment, vehicles recognize when there is an opportunity for them to participate in content sharing, such as when a vehicle is temporarily stopped at a traffic signal, or stuck in traffic, or the like. In response to this opportunity, the vehicle can notify a coordination component, sending a manifest of content it has available for sharing and content that it desires. The coordination component can match two vehicles in location and time, and can facilitate a secure wireless content share transaction. Such a transaction can involve use of ephemeral wireless network parameters, including temporary network names, passwords and/or security keys. Feedback about the success of the content transfer may be reported to system component(s) to improve identification of sharing opportunities in the future.

14 Claims, 2 Drawing Sheets

(56) References Cited

U.S. PATENT DOCUMENTS

| | | |
|---|---|---|
| 7,240,100 B1 | 7/2007 | Wein et al. |
| 7,251,688 B2 | 7/2007 | Leighton et al. |
| 7,274,658 B2 | 9/2007 | Bornstein et al. |
| 7,293,093 B2 | 11/2007 | Leighton et al. |
| 7,484,002 B2 | 1/2009 | Swildens et al. |
| 7,523,181 B2 | 4/2009 | Swildens et al. |
| 7,574,499 B1 | 8/2009 | Swildens et al. |
| 7,603,439 B2 | 10/2009 | Dilley et al. |
| 7,716,367 B1 | 5/2010 | Leighton et al. |
| 7,725,602 B2 | 5/2010 | Liu et al. |
| 7,912,978 B2 | 3/2011 | Swildens et al. |
| 7,925,713 B1 | 4/2011 | Day et al. |
| 7,996,531 B2 | 8/2011 | Freedman |
| 8,195,831 B2 | 6/2012 | Swildens et al. |
| 8,400,297 B2 | 3/2013 | Tuttle |
| 8,612,136 B2 | 12/2013 | Levine et al. |
| 8,762,035 B2 | 6/2014 | Levine et al. |
| 8,909,735 B2 | 12/2014 | Swildens et al. |
| 9,894,489 B2 | 2/2018 | Johnson et al. |
| 9,911,016 B2 | 3/2018 | Ownby et al. |
| 10,586,083 B2 | 3/2020 | Ownby et al. |
| 10,667,172 B2 | 5/2020 | Ingerman |
| 10,785,293 B2 | 9/2020 | Law |
| 11,184,734 B1 * | 11/2021 | Carraway ............ H04W 4/021 |
| 2009/0326685 A1 | 12/2009 | Meixner et al. |
| 2010/0223376 A1 | 9/2010 | Park et al. |
| 2016/0134691 A1 | 5/2016 | Law |
| 2017/0344355 A1 | 11/2017 | Sarkar et al. |
| 2019/0037349 A1 | 1/2019 | Frusina et al. |
| 2019/0253853 A1 | 8/2019 | Makled et al. |
| 2019/0386923 A1 | 12/2019 | Ingerman et al. |
| 2020/0068654 A1 | 2/2020 | Lauer |
| 2020/0228950 A1 * | 7/2020 | Clark .................... H04L 67/06 |
| 2020/0288374 A1 | 9/2020 | Henry et al. |
| 2020/0348923 A1 | 11/2020 | Mezaael et al. |

OTHER PUBLICATIONS

PCT/US2021071914, counterpart to current application, Written Opinion, mailed on Dec. 30, 2021, 6 pages.

PCT/US2021071914, counterpart to current application, Search Strategy, mailed on Dec. 30, 2021, 1 page.

U.S. Appl. No. 16/010,604, filed Jun. 18, 2018.

Sheldon, Andrew, "The Once and Future Automobile", article in "Your AAA" Magazine, Official Magazine of AAA Northeast, Fall 2020, published Jul./Aug. 2020, cover page and p. 17 article provided (2 pages total).

* cited by examiner

IDENTIFICATION AND COORDINATION OF OPPORTUNITIES FOR VEHICLE TO VEHICLE WIRELESS CONTENT SHARING

BACKGROUND

Technical Field

This patent document generally relates to the wireless sharing of content between vehicles.

Brief Description of the Related Art

Vehicles require an increasing amount of content from wireless networks. Not only do vehicle occupants want more data for their devices (over in-vehicle wireless networks), but vehicles themselves are becoming more dependent on software and firmware. Updates to vehicle head units, such as patches to correct safety issues, fix bugs, add features, or the like, may be hundreds of megabytes or more. Navigation units, vehicle telematics and diagnostics monitoring, and in-vehicle entertainment also place large demands on wireless connections.

While wide area wireless networks (cellular networks) are always improving, they are still expensive and slow compared to local wireless networks. Most vehicles can now accommodate high-throughput local wireless networks using WiFi (IEEE 802) and related technologies. Moreover, many vehicles often need the same content. Maps for navigation, and entertainment files may be usable by many vehicle makes and models. Head unit updates may be applicable to one or more models of vehicles, and while perhaps more limited in that way, even so there may be many such vehicles around. Vehicles are often in proximity to one another for periods of time while traveling, so it is possible for them to wirelessly share data in a peer to peer manner during those moments, i.e., in brief wireless network sessions. But the real-time coordination of such sharing is a challenge. Moreover, sliming content between vehicles can raise serious security concerns. Vehicles should not connect or allow connections from unknown entities. Moreover a vehicle must be able to verify the content it obtains is authentic, particularly if it is intended to patch vehicle systems.

The teachings presented in this patent document address these needs and others that will become apparent to those skilled in the art in light of this specification. The teachings presented herein improve the functioning of a computer system itself, improving the distribution of content in wireless networks and Internet of Things network environments. Those skilled in the art will understand these and other improvements from the teachings hereof.

BRIEF SUMMARY

This section describes some pertinent aspects of this invention. Those aspects are illustrative, not exhaustive, and they are not a definition of the invention. The claims of any issued patent define the scope of protection. The claims are incorporated by reference into this section, in their entirety.

Disclosed herein are systems and methods for coordinating the wireless sharing of content between vehicles in a secure and efficient manner. In one embodiment, vehicles recognize when there is an opportunity for them to participate in content sharing, such as when the vehicle is temporarily stopped at a traffic signal, or stuck in traffic, or the like. In response to this opportunity, the vehicle can notify a coordination component, sending a manifest of content it has available for sharing and content that it desires. The coordination component can match two vehicles in location and time, and can facilitate a secure wireless content share transaction. Such a transaction can involve use of ephemeral wireless network parameters, including temporary network names, passwords, and/or security keys. Feedback about the success of the content transfer may be reported to system component(s) to improve a vehicle's identification of sharing opportunities in the future. Based on such reports, machine learning models and/or opportunity profiles can be developed to improve the vehicle's identification of good opportunities for sharing, and also to enable the vehicle to rapidly identify such opportunities in real-time.

BRIEF DESCRIPTION OF THE DRAWINGS

The invention will be more fully understood from the following detailed description taken in conjunction with the accompanying drawings, in which.

Numerical labels are provided in some FIGURES solely to assist in identifying elements being described in the text; no significance should be attributed to the numbering unless explicitly stated otherwise.

DETAILED DESCRIPTION

The following description sets forth embodiments of the invention to provide an overall understanding of the principles of the structure, function, manufacture, and use of the methods and apparatus disclosed herein. The systems, methods and apparatus described in this application and illustrated in the accompanying drawings are non-limiting examples; the claims alone define the scope of protection. The features described or illustrated in connection with one exemplary embodiment may be combined with the features of other embodiments. Such modifications and variations are intended to be included within the scope of the present invention. All patents, patent application publications, other publications, and references cited anywhere in this document are expressly incorporated herein by reference in their entirety, and for all purposes. The term "e.g." used throughout is used as an abbreviation for the non-limiting phrase "for example."

The teachings hereof may be realized in a variety of systems, methods, apparatus, and non-transitory computer-readable media. It should also be noted that the allocation of functions to particular machines is not limiting, as the functions recited herein may be combined or split amongst different hosts in a variety of ways.

Any reference to advantages or benefits refer to potential advantages and benefits that may be obtained through practice of the teachings hereof. It is not necessary to obtain such advantages and benefits in order to practice the teachings hereof.

Basic familiarity with well-known web page, streaming, and networking technologies and terms, such as HTML, URL, XML, AJAX, CSS, Wifi, HTTP versions 1.1 and 2, HTTP over QUIC, MQTT, TCP/IP, and UDP, is assumed.

All references to HTTP should be interpreted to include an embodiment using encryption (HTTP/S), such as when TLS secured connections are established. The terms "client"

and "client device" are used herein to refer to hardware in combination with software (e.g., a browser or player application). While context may indicate the hardware or the software exclusively, should such distinction be appropriate, the teachings hereof can be implemented in any combination of hardware and software. Hardware may be actual or virtualized.

Overview

Figure 1:
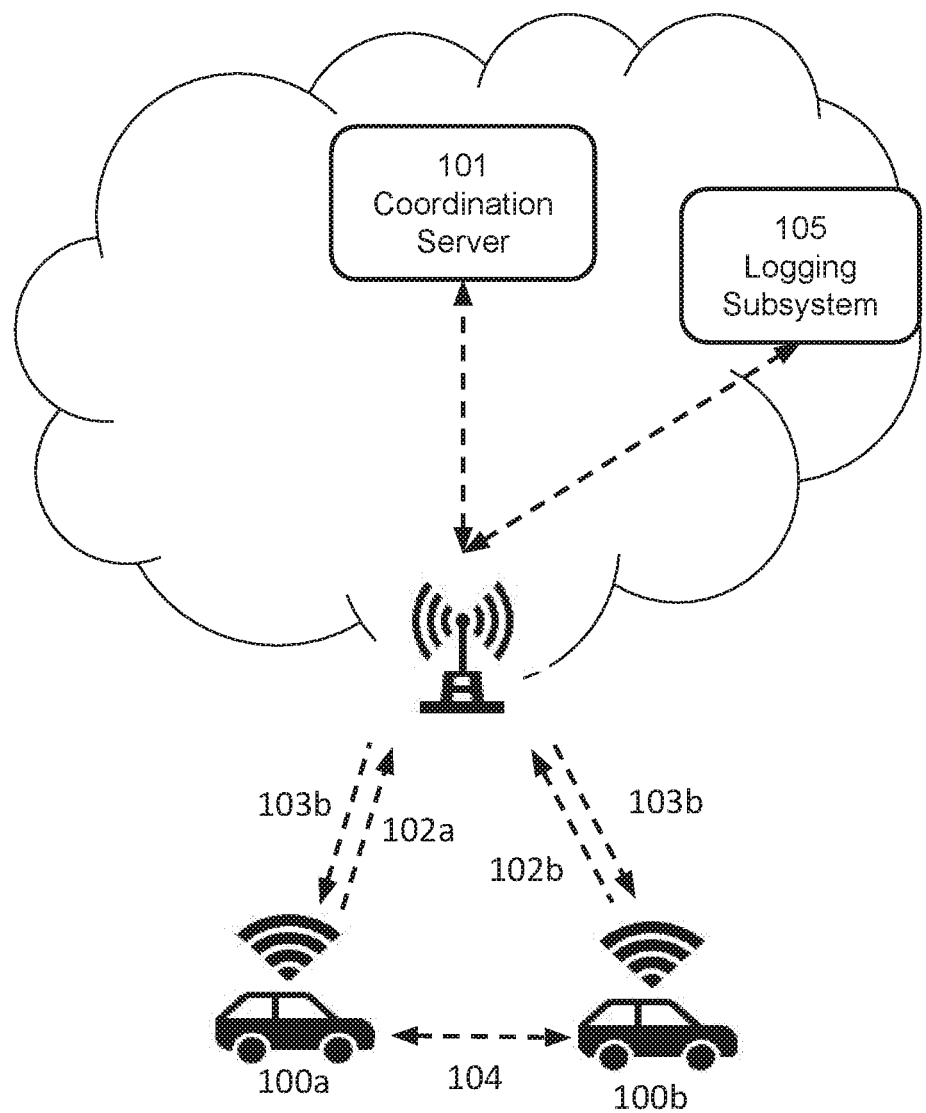
FIG. 1 is a block diagram illustrating a vehicle to vehicle wireless content sharing system; and, FIG. 2 is a block diagram illustrating hardware in a computer system that may be used to implement the teachings hereof.

FIG. 1 illustrates an example of a vehicle to vehicle wireless content sharing system in accord with the invention. Vehicles 100a . . . z in the system are responsible for independently identifying when they have opportunities for peer to peer wireless content sharing with other vehicles. These opportunities are typically brief, e.g., less than a minute long, as the vehicle is traveling. Examples include a vehicle stopped at a traffic signal, or moving slowly in congested traffic. In some instances, however, the opportunities may be longer, e.g., a vehicle parked at a store or restaurant, stopped in a drive-thru, or parked at an office building or workplace. Vehicles are not necessarily aware of other vehicles or whether other vehicles are available to participate, although this may be possible in some implementations. Preferably, vehicles rely only on internally available information to identify that the vehicle itself is in a situation where it could share content wirelessly (either sending or receiving).

Once a vehicle determines that it has a sharing opportunity, it sends one or more messages 102 to a coordination server 101 notifying the coordination server about the opportunity. The vehicle can send this notification via a wide area wireless network (e.g., cellular). The coordination server 101 may be a server located in the cellular network, or on the Internet. The coordination server may be a server in a CDN, and/or a broker in a publication/subscription network. There may be many such coordination servers 101 distributed around the Internet, in cellular networks and external to them. The process of selecting a particular coordination server 101 will be described in more detail later.

The notification messages 102a,b typically include several pieces of information. For example, upon identifying an opportunity for wireless content sharing, vehicle 100a can send its current location, or a predicted location in the very near future. It may also send an estimate of how long the opportunity will last from the current time (referred to as a time to live value, TTL, for the opportunity, i.e., an opportunity TTL). It also sends a set of data about its wireless network capabilities and configuration. Finally, the vehicle 100a sends a manifest of the content that (i) the vehicle 100a has stored and is available for sharing, and/or (ii) content that the vehicle 100a needs. Oftentimes large data files are broken into segments for transmission and delivery. Accordingly, the manifest may list entire files or segments. As will be apparent to those skilled in the art, the content may represent updates to on-board vehicle computer systems (e.g., head units, navigation units, entertainment units), and or content requested on behalf of vehicle occupants (e.g., multimedia, web traffic, etc.) for display either personal devices or vehicle user displays. The teachings hereof are agnostic to the type of content that is shared.

The coordination server 101 receives many such "opportunity" notification messages 102a,b from various vehicles. The coordination server 101 matches vehicles based on location, opportunity TTL, and the content needed and available between vehicles.

Assume that, like vehicle 100a, vehicle 100b has also notified the coordination server 101 that it has an opportunity for content sharing. Assume also that the coordination server matches vehicle 100b to vehicle 100a for sharing content in one or both directions. Upon detecting a match, the coordination server 101 generates ephemeral wireless network information. This can include a one-time or pseudo-random network name, password, and/or network security keys that the vehicles will be able to use in connecting to each other wirelessly. Preferably, these values are generated by the coordination server 101 for one-time use.

The coordination server 101 sends both vehicles 100a-b information that enables them to connect and share content. This information 103a,b can include, for example, sending the ephemeral wireless network information, as well as manifest detailing which items are allowed to be exchanged. One of the vehicles can be designated as the initiator in the transaction, i.e., the vehicle that will attach to the wireless network advertised by the other.

The vehicles connect, as shown by arrows 104, and share as much of the authorized content as they can. Eventually the vehicles will finish sending the content, and/or move apart from each other and no longer have the ability to stay connected. Once the transaction is over, each vehicle can gather content about the transaction, e.g., whether the vehicles could connect, the vehicles involved, the amount of content that was transferred, which files were sent/received, the characteristics of the network connection, and so on. This log can be sent to the coordination server 101, to a separate logging subsystem 105. The information in the transaction report can be paired with the data that caused each vehicle to identify the opportunity in the first place (referred to herein as the opportunity vector). A centralized analytics component, or the vehicles themselves, can analyze this information to improve the detection of sharing opportunities that are likely to be beneficial. For example, the information can be used to produce an opportunity profile and/or machine learning model that captures situations (locations, speeds, content types, time of day, etc.) that are likely to produce useful content sharing. A vehicle can quickly apply the profile and/or model to determine whether its current circumstances represent a good sharing opportunity. Likewise, the coordination server can leverage this information to make better matches.

With the foregoing by way of introduction, each step in the content sharing process is now described in more detail.

Detection of Wireless Content Sharing Opportunities

As mentioned, typically a vehicle is responsible for detecting when it believes it has a suitable opportunity for wireless content sharing, and for communicating that determination to a coordination server. Preferably a vehicle does not discover other vehicles through direct communication with those other vehicles. A vehicle can detect an opportunity based on a variety of pieces of information available locally at the vehicle, e.g., from vehicle sensors and other information stored at the vehicle. This information includes a variety of things described in the following paragraphs.

A. Current or imminent location. Preferably the vehicle understands its location not just as a set of coordinates, but in terms of its semantics relative to the ability to wirelessly content share. For example, a vehicle may detect its latitude and longitude from an onboard global positioning satellite (GPS) system, and correlate that information with maps from an onboard navigation system to determine that the vehicle is stopping (or stopped) at an intersection with a traffic signal, or on a congested and limited access road (meaning the vehicles near it will remain nearby for some time), or in a parking lot associated with a particular store, restaurant, or other type of building. An imminent location may be deduced from a currently active navigation route, if any. It may also be predicted from travel history—a route commonly driven (e.g., commute to office, drive to shopping mall) at a given day/time.

B. Current speed.

C. Content needed or available to share. A vehicle knows the files that it stores that are eligible for sharing. Some types of content may be marked as eligible while others are not. Such files may be associated with a time to live (TTL), after which they should no longer be shared. Vehicle updates and navigation files may have relatively long TTLs, while movies and web pages have shorter TTLs.

D. Administrative overrides. A user and/or administrator may override sharing (e.g., to prevent content sharing in certain circumstances).

E. Transaction History/Intelligence. A vehicle preferably has access to intelligence that looks at past transactions for the vehicle (or class of vehicles) and identifies those situations that are likely to be worthwhile opportunities for content sharing. The utility of sharing content can be evaluated based on the transaction costs of setting up the content share and connecting compared to how much data has actually been able to be shared successfully in such circumstances. Each vehicle can produce a log of a content sharing transaction, known as a transaction report, which can be paired with the opportunity vector (e.g., data elements A to D above) that the vehicle identified when it thought it had a quality opportunity for sharing. Over time, an aggregated set of such opportunity vectors and associated transaction reports can be used to develop artificial intelligence that helps identify good opportunities for content sharing. Then, a vehicle can quickly match its current opportunity vector to the profile, or apply the developed model, to determine whether to actually notify the coordination server 101. More detail will be provided about these techniques later.

If the opportunity will be too short to effectively content share, e.g., based on historical patterns or on a predetermined, configured minimum threshold, then the vehicle can suppress the opportunity notification process. In some cases, a vehicle may not know, in which case it may default one way or the other.

As noted, in preferred embodiments a vehicle detects a sharing opportunity without contacting or detecting other vehicles. However, in alternative embodiments, a vehicle can detect the presence of other vehicles and factor this into the decision-making logic. For example, if vehicles are equipped with self-driving mechanisms, then they may have cameras or other proximity sensors that can inform the vehicle when it is close to other vehicles (and within range of a wireless radio). Furthermore, vehicles could be equipped with radio-frequency-id (RFID) tag, allowing nearby vehicles to query it and obtain an vehicle identifier. The identifier can be structured in a variety of ways: for example, it can encode the make and model of the vehicle with the vehicle identification number (VIN), which is hashed. Preferably the RFID is programmable, i.e., the vehicle's head unit can program the RFID with an identifier value, and rotate the identifier value periodically, for security. A vehicle querying this RFID on a nearby vehicle can send this information up to the coordination server to assist in finding a match, or possibly decode a portion of it. It also may be useful in determining whether an opportunity notification is worth sending (e.g., if the identifier indicates that the other vehicle is the same make and/or model, it may be more likely to have updates that the querying vehicle needs).

Finding a Coordination Server

When a vehicle decides that it has an opportunity for wireless content sharing, it needs to notify a coordination server 101. To do this, it must locate an appropriate coordination server 101, one which is preferably responsible for—or at least knowledgeable about—vehicles in the area. This discovery function can be accomplished in a variety of ways. For example, a mobile network operator could associate a well-known address to a coordination server for each cell tower. Alternatively, CDN request routing technologies can be used. For example, an Anycast address could be established for coordination servers so that vehicles in a given area connect to a common (and preferably nearby) coordination server. The vehicle could make a DNS query to a configured name, which a CDN authoritative DNS can resolve to the nearest coordination server 101. Another option is to have vehicles use a publish/subscribe mechanism (e.g., MQTT or otherwise), whereby they publish the notification on a known topic (for example, one associated with the navigation coordinates or a given vector associated with a road). A subscribing broker, acting as the coordination server then reads the notifications for a given cell tower and correlates vehicles.

Sending Opportunity Notifications to the Coordination Server

As mentioned, opportunity notification can be a set of one or more messages that inform the coordination server of the vehicle's detected opportunity. Because opportunities are typically short in time, it is preferable that the notification also includes information on what wireless network capabilities the vehicle has and what content the vehicle wants & what it has, as there may not be enough time for a back and forth protocol. Hence, the notification messages can include an identification of the notifying vehicle and its location (in this case the location can be just coordinates, though semantic information described earlier could be included); a set of wireless network capabilities, and an opportunity TTL.

Preferably the notifying vehicle also includes a manifest of the content that it has available for sharing with other vehicles, and/or that it needs. The latter may be determined from active in-progress vehicle update campaigns, or from pending requests from vehicle subsystems (e.g., map update for vehicle navigation unit) or from occupants' mobile devices.

In some embodiments, the coordination server 101 can be configured to recommend a download. For example, if vehicle B has content that vehicle A will soon need (e.g., an imminent vehicle update), then the coordination server might add that content to the list of items to be shared even if not on the notifying vehicle's manifest initially.

Matching Vehicle Opportunities

The coordination server matches vehicles based on the information in the opportunity notifications.

An initial consideration is, preferably, the temporal validity of the opportunity. Timely matching is useful since many opportunities will be short in duration. Further, matching vehicles that can no longer viably share data is a waste of resources. To this end, each vehicle can include with its opportunity notification both a timestamp and the aforementioned opportunity TTL calculated from the timestamp. As noted, a vehicle may set the TTL value based on the nature of the opportunity that it sees (e.g., shorter for a traffic light, longer for a parked vehicle). If the vehicle does not include a TTL, the coordination server can assign a TTL based on its examination of the information in the opportunity notification, or use a configured default time period.

Either way, before matching any notification, the coordination server initially checks whether an opportunity notification is still valid. If not, the opportunity has passed and it is discarded.

Assuming opportunity notifications are not stale, they can be matched on the following criteria:

Proximity—based on location; i.e., are the vehicles in range of each other's wireless radios?

Compatible wireless capabilities

Content Match—based on the manifests, does at least one of the vehicles have content that the other needs?

Opportunity Duration—based on the location and/or nature of the location and/or a predicted opportunity duration from the vehicles, is there enough time to transfer the content, or some portion thereof, that was identified as part of the Content Match?

With respect to the opportunity duration, note that the wireless connection does not have to last too long. Say vehicle A is heading north, and vehicle B is heading west. They are both stopped at a traffic light. Either there is a turn signal so neither can proceed or a walk light. Either way, the cars are likely stopped for 15 seconds. If the connection negotiation and coordination takes 5 seconds, there is still 10 seconds of data transfer. Because WiFi can send data at rates from 200 Mbps to just over 1 Gbps, even a slow rate. 200 Mbps that lasts 10 seconds can send 200 MB of information.

Notifying Vehicles and Setting Up for Content Share

Once the coordination server finds a match, it notifies each of the vehicles involved (sharing notification). One of the vehicles will be selected to provide the wireless network (host peer), and the other vehicle will connect to that network (connecting peer).

To set up a sharing transaction, the coordination server preferably generates a set of wireless ephemeral network parameters for the two vehicles to use. This information may include such things as a temporary network name, network password, and/or a set of temporary TLS or other keys for others to use in connecting to the notifying vehicle. These values may be one-time use, although some aspects (such as a network name) could be rotated periodically instead. Note that preferably the network name is temporary, but this is not a requirement. If using the Wifi standard, then the network name is usually referred to as the SSID.

The sharing notification, in embodiments, can include such information as follows.

For the host peer:
A. A value indicating telling the vehicle that it is the host peer for the wireless network in this transaction. The host peer can also by default be the server in the transaction—the connecting peer being the client—however this is not mandatory and could be changed by the coordination server.
B. A value that identifies the connecting peer. A variety of options are possible here. This may be a token (e.g., JWT token) generated by the coordination server to identify the connecting peer and provided to each vehicle.
C. The ephemeral network name, password, and connection keys that the connecting peer will use.
D. A manifest identifying the content that the connecting peer is authorized to download and that the host peer is authorized to share. Sharing can be bi-directional, so the manifest can also identify content of interest to the host peer that the connecting peer has and is authorized to share. Preferably the manifest identifies content in a priority order, so that the most crucial content can be shared first, in case the connection drops. Each file, segment or other item of content can be identified by a token that confers entitlement to share the item. For security, these tokens are preferably generated by the coordination server for each item and then provided to each vehicle. However, it may be useful, in some implementations and use cases, with respect to the initial opportunity notification, for each vehicle can itself generate a token (e.g., a time-limited, salted hash of a file or segment) for the items that it can share, and include these in manifest in the opportunity notification messages sent to the coordination server. Then the coordination server can simply forward such tokens to the connecting peer to use in requesting each item. Note that a variety of implementations are possible. A token can be a JWT or other token; or a key to validate the token; or the public key of a certificate that the other vehicle will send.
E. A timestamp and time-limit for the sharing.
F. An address for where to send a report of the transaction (which could be the logging server, or the coordination server). Alternatively, the vehicles could default to the coordination server they are using, or a well-known address.
G. Any decryption keys necessary to decrypt downloaded content. This could be a shared secret for both encryption and decryption.

For the connecting peer:
A. A value indicating telling the vehicle that it is the connecting peer for the wireless network in this transaction. The connecting peer can also by default be the client in the transaction—the host peer being the server—however this is not mandatory and could be changed by the coordination server.
B. A value that identifies the host peer. A variety of options are possible here. This may be a token (e.g., JWT token) generated by the coordination server to identify the host peer and provided to each vehicle.
C. The ephemeral network name, password, and connection keys that the connecting peer will need to recognize and connect to the host wireless network.
D. A manifest identifying the content that the connecting peer is authorized to download, and that the host peer is authorized to share. Sharing can be bi-directional, so the manifest can also identify content of interest to the host peer that the connecting peer has and is authorized to share. Preferably the manifest identifies content in a priority order, so that the most crucial content can be shared first, in case the connection drops. Each file, segment or other item of content can be identified by a token that confers entitlement to share the item. For security, these tokens are preferably generated by the coordination server to identify each item and then provided to each vehicle. However, it may be useful, in some implementations and use cases, with respect to the initial opportunity notification, for each vehicle can itself generate a token (e.g., a time-limited, salted hash of a file or segment) or the items that it is willing to share, and include these in manifest in the opportunity notification to the coordination server. Then the coordination server can simply forward such tokens to the connecting peer to use in requesting each item.
E. A timestamp and time-limit for the sharing.
F. An address for where to send a report about the transaction (which could be the logging server, or the coordination server). Alternatively, the vehicles could default to the coordination server they are using, or a well-known address.

G. Any decryption keys necessary to decrypt downloaded content. This could be a shared secret for both encryption and decryption.

Each of the items above can be authenticated in known ways. For example, each time, or the items together, can be signed with a message digest signed by the coordination server with a private key, which the recipient vehicle can then verify with the connection server's public key.

Logging Results of Content Sharing

Upon receipt of the sharing notifications from the coordination server, the connecting peer will attempt to connect to the host peer's wireless network, and request the content that the connecting peer has been authorized to download. Entitlement tokens can be presented by the requesting vehicle to identify the content items that it needs and is authorized to obtain—which the receiving vehicle can verify based on what it got from the coordination server.

Once the connection is closed, or lost, the host peer vehicle and the connecting peer vehicle can each generate a transaction report. Preferably, a vehicle associates a transaction report with the data that caused the vehicle to send the opportunity notification (referred to above as the opportunity vector).

Typical information captured in a transaction report includes:

A. Transaction identifier, day/time
B. Identifier for host peer vehicle and connecting peer vehicle. This can be hashed or otherwise obfuscated in the reports to address privacy concerns, and indeed could be hashed even before sharing with any other vehicles in a transaction.
C. Identification of the content successfully shared
D. Amount (bytes) of data shared
E. Connection characteristics, such as data rate, duration, signal power, etc.
F. Reason that connection ended (transfer finished, loss of connection/signal, etc.), any connection drops and retries
G. Diagnostic timestamps (e.g., timestamp of when vehicle sent opportunity notification, timestamp for receiving sharing notification, timestamp of connection opened, timestamp of first byte sent/received, etc.)
H. Opportunity vector that caused the vehicle to send opportunity notification to coordination server; this will facilitate improving opportunity vector calculations moving forward and should include the contextual data and 'reasoning steps'.

Each vehicle can send a transaction report (with its associated opportunity vector) to the logging server (e.g., 105 in FIG. 1) or other destination. In some implementations, a vehicle will aggregate many transaction reports together (with their opportunity vectors) before sending them in a batch.

Improving Detection of Quality Sharing Opportunities Based on Historical Data of Past Transactions As noted above, vehicles can create transaction reports upon the completion of each content sharing transaction. Such transaction reports can be used in a variety of ways, including billing, network monitoring, and the like. They can also be used to improve the identification of 'quality' content sharing opportunities by the vehicles. The term 'quality' is used to indicate that the criteria for evaluating the success of a content sharing transaction may differ from use case to use case. At a basic level, the goal is that enough data is shared to make the computing and bandwidth cost of coordination and setup worthwhile. In this regard, a wide variety of utility and cost metrics can be developed in light of the particular factors involved wherever the system is deployed.

There are at least two aspects of opportunity detection that artificial intelligence can improve. The first is an accurate prediction of the duration of a sharing opportunity. The goal is that a vehicle can predict from a given location (intersection) and/or other circumstances how long the opportunity is likely to be, i.e., an accurate opportunity TTL. The second aspect is how likely it is that another vehicle is nearby and has the content needed by the vehicle. This is a function of a variety of things, including in particular the type of the content.

In one embodiment, the historical transaction reports can be analyzed using machine learning techniques to produce a model that can quickly evaluate real-time data available at the vehicle (e.g., the location, speed, content needed, etc.) to decide if a situation is a worthwhile opportunity for content sharing. The goal would be to reduce the ineffective opportunity vectors and increase the effective ones.

For example, a machine learning classifier can be used. Transaction reports can be classified into two or more classes based on the relative success of the content sharing transaction. A "green" class could represent a transaction with a relatively large amount of data transferred, i.e., a configured minimum amount of bytes shared, or of a minimum duration, or some combination of factors as desired by the user. A "red" class could represent transactions with a small amount of data and/or a noisy/slow connection. A "yellow" class could be somewhere in between. Each transaction report can be labeled green, yellow, or red, and then the corresponding opportunity vector would be labeled the same way. Known machine learning techniques can be used to train a machine learning model on these labeled opportunity vectors, a model can be developed that takes a new opportunity vector and predicts whether it will produce a content sharing transaction that is green, yellow, or red. Finally, the vehicle can be programmed to apply this model to the information that the vehicle is constantly monitoring, and thereby reach a determination on a given real-time opportunity vector should result in issuing an opportunity notification to the coordination server. The vehicle could be configured to respond in various ways to the machine learning model's decision. For example, a green opportunity may mean that the vehicle should issue an opportunity notification right away. A yellow opportunity could be ignored, unless the vehicle were looking for a critical update. A red opportunity would be ignored altogether. These are just examples.

Individual machine learning models can be developed to improve specific factors, rather than produce a final conclusion. For example, a model can be developed to refine a vehicle's prediction of the duration of the opportunity. If the vehicle is predicting that it has 20 seconds at an intersection, it may learn over time that the reality is only 10 seconds, and therefore adjust its decision-making logic with regards to whether to notify the coordination server of an opportunity. A model can be developed to refine a vehicle's assessment of the likelihood that other vehicles will be near it and have the content that it needs. For example, the model may learn that a given intersection typically does not have much other traffic. Or the model may learn that a given content item is not very common—likewise these can be fed into the decision making process.

Model development could take place either centrally or in the vehicles, or a combination thereof. For example, it might take place centrally in the system (in servers associated with the logging subsystem), so that vehicles have the benefit of the experiences of other vehicles, or simply to offload processing from vehicle computers. The central processing location would also have suitable processing power to develop models based on system-wide factors such as whether a vehicle in a given location is likely to encounter other vehicles (e.g., a rural intersection with light traffic might mean 'no'), and/or the prevalence of a given type of content given the location of a vehicle.

Vehicles can run machine learning algorithms, e.g., based on the information that they have—their own opportunity vectors and their own content transaction reports that they generate. In this way, the model is automatically customized to the locations and routes of the particular vehicle. This can be used on its own, or to adjust the model developed centrally.

Alternatively, sharing opportunities can be evaluated using techniques that may not be considered machine learning in the classical sense but are based on historical transactions. For example, from the logs, a set of transaction reports can be extracted (filtered out) based on meeting certain criteria for "success". Such criteria may include for example, the connection not having been dropped, at least N megabytes of data transferred, average data rate of at least X megabytes per second, and so on. Then, the opportunity vectors associated with the extracted "successful" transactions can be identified and aggregated to produce a profile. For example, the profile could contain ranges of parameters based on the range seen for such values across the "successful" opportunity vectors, or based on the 25% to 75% percentiles value across them, etc. Such a profile can contain ranges indicating sharing locations, durations, distances. In operation, the vehicle could quickly compare information (that is, its current opportunity vector) to the profile; if the vector meets the profile criteria, the vehicle issues an opportunity notification.

Like the development of the machine learning model, the opportunity profile can be performed centrally using a dedicated set of servers in the system. They could alternatively be performed at each vehicle. In the latter case, the input is typically only the transaction reports and opportunity vectors available locally at a given vehicle, and likewise the task is only to produce an opportunity profile that is suitable for the given vehicle. For example, the vehicle can identify that it has been at a given intersection many times and the light typically takes X seconds, which is (or is not) enough for a transaction.

Vehicles

The term vehicle, it should be noted, is not limited to cars and trucks. The teachings hereof can be applied to trains, airplanes when not at the gate (e.g., next to one another on a tarmac, or otherwise), vehicle fleet operations, public transit vehicles (e.g., buses, trams), construction equipment, and the like. The teachings hereof could be used for other moveable objects, such as cell phones, or other mobile devices such as handheld scanners. Anything that needs to be 'updated' with content.

Use with Content Delivery Networks (CDNs)

As mentioned, the teachings hereof can be implemented with a CDN server acting as the coordination server 101. More information about CDN technologies can be found in the following documents, the teachings of which are hereby incorporated by reference in their entireties: U.S. Pat. Nos. 6,108,703; 7,293,093; 7,096,263; 7,096,266; 7,484,002; 7,523,181; 7,574,499; 7,240,100; 7,603,439; 7,725,602; 7,716,367; 7,996,531; 7,925,713; 7,058,706; 7,251,688; 7,274,658; 7,912,978; 8,195,831.

Computer Based Implementation

The teachings hereof may be implemented using conventional computer systems, but modified by the teachings hereof, with the components and/or functional characteristics described above realized in special-purpose hardware, general-purpose hardware configured by software stored therein for special purposes, or a combination thereof, as modified by the teachings hereof.

Software may include one or several discrete programs. Any given function may comprise part of any given module, process, execution thread, or other such programming construct. Generalizing, each function described above may be implemented as computer code, namely, as a set of computer instructions, executable in one or more microprocessors to provide a special purpose machine. The code may be executed using an apparatus—such as a microprocessor in a computer, digital data processing device, or other computing apparatus—as modified by the teachings hereof. In one embodiment, such software may be implemented in a programming language that runs in conjunction with a proxy on a standard Intel hardware platform running an operating system such as Linux. The functionality may be built into the proxy code, or it may be executed as an adjunct to that code.

While in some cases above a particular order of operations performed by certain embodiments is set forth, it should be understood that such order is exemplary and that they may be performed in a different order, combined, or the like. Moreover, some of the functions may be combined or shared in given instructions, program sequences, code portions, and the like. References in the specification to a given embodiment indicate that the embodiment described may include a particular feature, structure, or characteristic, but every embodiment may not necessarily include the particular feature, structure, or characteristic.

Figure 2:
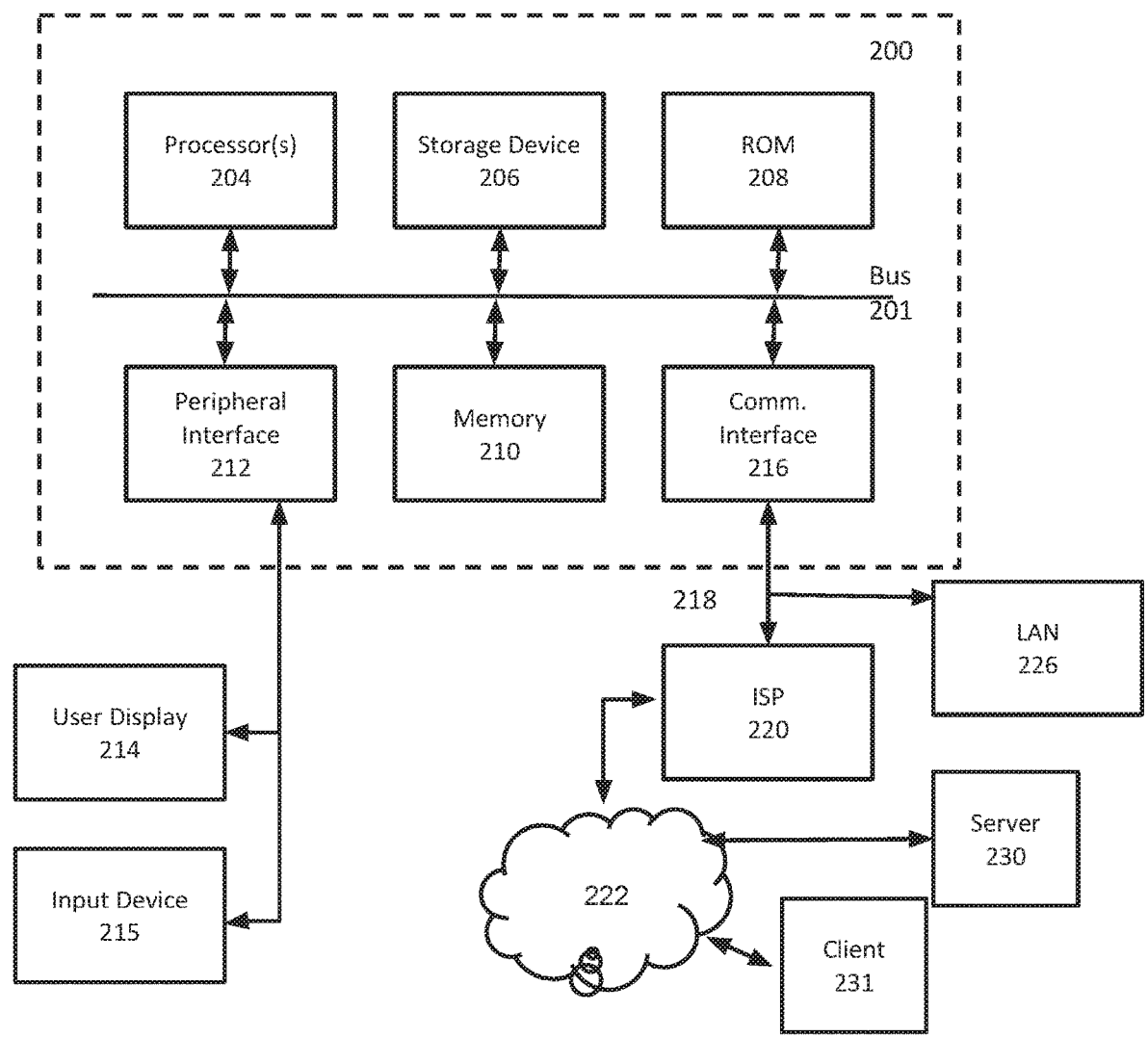

FIG. 2 is a block diagram that illustrates hardware in a computer system 200 upon which such software may run in order to implement embodiments of the invention. The computer system 200 may be embodied in a client device, server, personal computer, workstation, tablet computer, mobile or wireless device such as a smartphone, network device, router, hub, gateway, or other device. Representative machines on which the subject matter herein is provided may be a computer running a Linux or Linux-variant operating system and one or more applications to carry out the described functionality.

Computer system 200 includes a microprocessor 204 coupled to bus 201. In some systems, multiple processor and/or processor cores may be employed. Computer system 200 further includes a main memory 210, such as a random access memory (RAM) or other storage device, coupled to the bus 201 for storing information and instructions to be executed by processor 204. A read only memory (ROM) 208 is coupled to the bus 201 for storing information and instructions for processor 204. A non-volatile storage device 206, such as a magnetic disk, solid state memory (e.g., flash memory), or optical disk, is provided and coupled to bus 201 for storing information and instructions. Other application-specific integrated circuits (ASICs), field programmable gate arrays (FPGAs) or circuitry may be included in the computer system 200 to perform functions described herein.

A peripheral interface 212 may be provided to communicatively couple computer system 200 to a user display 214 that displays the output of software executing on the computer system, and an input device 215 (e.g., a keyboard, mouse, trackpad, touchscreen) that communicates user input and instructions to the computer system 200. However, in many embodiments, a computer system 200 may not have a user interface beyond a network port, e.g., in the case of a server in a rack. The peripheral interface 212 may include interface circuitry, control and/or level-shifting logic for local buses such as RS-485, Universal Serial Bus (USB), IEEE 1394, or other communication links.

Computer system 200 is coupled to a communication interface 216 that provides a link (e.g., at a physical layer, data link layer,) between the system bus 201 and an external communication link. The communication interface 216 provides a network link 218. The communication interface 216 may represent an Ethernet or other network interface card (NIC), a wireless interface, modem, an optical interface, or other kind of input/output interface.

Network link 218 provides data communication through one or more networks to other devices. Such devices include other computer systems that are part of a local area network (LAN) 226. Furthermore, the network link 218 provides a link, via an internet service provider (ISP) 220, to the Internet 222. In turn, the Internet 222 may provide a link to other computing systems such as a remote server 230 and/or a remote client 231. Network link 218 and such networks may transmit data using packet-switched, circuit-switched, or other data-transmission approaches.

In operation, the computer system 200 may implement the functionality described herein as a result of the processor executing code. Such code may be read from or stored on a non-transitory computer-readable medium, such as memory 210, ROM 208, or storage device 206. Other forms of non-transitory computer-readable media include disks, tapes, magnetic media, SSD, CD-ROMs, optical media, RAM, PROM, EPROM, and EEPROM, flash memory. Any other non-transitory computer-readable medium may be employed. Executing code may also be read from network link 218 (e.g., following storage in an interface buffer, local memory, or other circuitry).

It should be understood that the foregoing has presented certain embodiments of the invention but they should not be construed as limiting. For example, certain language, syntax, and instructions have been presented above for illustrative purposes, and they should not be construed as limiting. It is contemplated that those skilled in the art will recognize other possible implementations in view of this disclosure and in accordance with its scope and spirit The appended claims define the subject matter for which protection is sought.

It is noted that any trademarks appearing herein are the property of their respective owners and used for identification and descriptive purposes only, and not to imply endorsement or affiliation in any way.

The invention claimed is:

1. A method for sharing content wirelessly between vehicles, comprising:
  a first vehicle independently identifying an opportunity for wireless content sharing between vehicles, based on information available internally at the first vehicle and without communication to a second vehicle;
  responsive to the opportunity, the first vehicle wirelessly transmitting one or more messages to notify a coordination server of the opportunity;
  the one or more messages comprising: location information for the first vehicle, and a manifest identifying content for wireless content sharing;
  the coordination server, upon receipt of the one or more messages, matching the first vehicle to the second vehicle that can participate in wireless content sharing of the content with the first vehicle;
  upon said matching, the coordination server sending notification of an imminent wireless content sharing transaction to the first and second vehicles, and sending wireless information to a connecting peer, the connecting peer being one of the first and second vehicles, for use in connecting wirelessly to the other vehicle;
  the connecting peer using the wireless information to wirelessly connect to the other vehicle; and,
  wherein at least some of the content is thereafter transmitted wirelessly between the first and second vehicles.

2. The method of claim 1, wherein the opportunity lasts no more than one minute.

3. The method of claim 1, wherein the first vehicle independently identifies the opportunity for wireless content sharing based at least in part on past history of wireless content sharing transactions stored at the first vehicle.

4. The method of claim 3, wherein the first vehicle independently identifies the opportunity for wireless content sharing based at least in part on at least one of:
  a machine learning model stored at the first vehicle and trained on past wireless content sharing transaction reports, and
  an opportunity profile stored at the first vehicle and developed from past wireless content sharing transaction reports.

5. The method of claim 1, wherein the first vehicle generates a prediction of how long the opportunity will be, and determines whether there is the opportunity based at least in part on said length of time.

6. The method of claim 1, wherein the information available internally at the first vehicle comprises information from one or more vehicle sensors.

7. The method of claim 1, wherein the wireless information comprises at least one of: a temporary network name, a temporary password, and a temporary connection key.

8. The method of claim 1, wherein at least some of the content transmitted wirelessly between the first and second vehicles comprises vehicle updates from an update campaign.

9. The method of claim 1, further comprising, upon said matching, the coordination server sending one or both of the first and second vehicles an entitlement, the entitlement conferring at least one of:
  an authorization to send particular content from the first vehicle to the second vehicle,
  an authorization to send particular content from the second vehicle to the first vehicle,
  an authorization to receive particular content at the first vehicle from the second vehicle, and,
  an authorization to receive particular content at the second vehicle from the first vehicle.

10. The method of claim 1, wherein the one or more messages further comprises a time to live value, determined by the first vehicle, for the opportunity.

11. The method of claim 1, wherein the one or more messages further comprises wireless capabilities of the first vehicle.

12. The method of claim 1, further comprising: after said transmission of the content between the first and second vehicles, at least one of the first and second vehicles generating a transaction report of the content transfer, and using the transaction report to improve at least one of the first and second vehicle's identification of future opportunities for wireless content sharing.

13. A system for sharing content wirelessly between vehicles, comprising:
- a first vehicle having a first computer system (i) for independently identifying an opportunity for wireless content sharing between vehicles, based on information available internally at the first vehicle and without communication to a second vehicle,
- (ii) and for, responsive to the opportunity, transmitting one or more messages to notify a coordination server of the opportunity;
- the one or more messages comprising: location information for the first vehicle, and a manifest identifying content for wireless content sharing;
- the coordination server, upon receipt of the one or more messages, matching the first vehicle to the second vehicle that can participate in wireless content sharing of the content with the first vehicle;
- upon said matching, the coordination server sending notification of an imminent wireless content sharing transaction to the first and second vehicles, and sending wireless information to a connecting peer, the connecting peer being one of the first and second vehicles, for use in connecting wirelessly to the other vehicle;
- the connecting peer using the wireless information to wirelessly connect to the other vehicle; and,
- wherein at least some of the content is thereafter transmitted wirelessly between the first and second vehicles;
- wherein the coordination server, and the computer system of the first vehicle, each comprise at least one processor formed by circuitry and memory storing computer program instructions for execution on the at least one processor to operate as specified above.

14. A non-transitory computer readable mediums holding computer program instructions for execution on one or more processors to cause a first vehicle, a second vehicle, and a coordination server to perform steps comprising:
- the first vehicle independently identifying an opportunity for wireless content sharing between vehicles, based on information available internally at the first vehicle and without communication to the second vehicle;
- responsive to the opportunity, the first vehicle wirelessly transmitting one or more messages to notify the coordination server of the opportunity;
- the one or more messages comprising: location information for the first vehicle, and a manifest identifying content for wireless content sharing;
- the coordination server, upon receipt of the one or more messages, matching the first vehicle to the second vehicle that can participate in wireless content sharing of the content with the first vehicle;
- upon said matching, the coordination server sending notification of an imminent wireless content sharing transaction to the first and second vehicles, and sending wireless information to a designated connecting peer, the connecting peer being one of the first and second vehicles, for use in connecting wirelessly to the other vehicle;
- the connecting peer using the wireless information to wirelessly connect to the other vehicle; and,
- wherein at least some of the content is thereafter transmitted wirelessly between the first and second vehicles.

\* \* \* \* \*